(12) United States Patent
Huang (10) Patent No.: US 11,682,183 B2
(45) Date of Patent: *Jun. 20, 2023

(54) AUGMENTED REALITY SYSTEM AND ANCHOR DISPLAY METHOD THEREOF

(71) Applicant: Acer Incorporated, New Taipei (TW)

(72) Inventor: Chao-Shih Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/518,534

(22) Filed: Nov. 3, 2021

(65) Prior Publication Data

US 2022/0058887 A1 Feb. 24, 2022

Related U.S. Application Data

(63) Continuation of application No. 17/022,038, filed on Sep. 15, 2020, now Pat. No. 11,205,309.

(30) Foreign Application Priority Data

May 6, 2020 (TW) .................................. 109115102

(51) Int. Cl.
*G06T 19/20* (2011.01)
*G02B 27/01* (2006.01)
*G06T 19/00* (2011.01)

(52) U.S. Cl.
CPC ............ *G06T 19/20* (2013.01); *G02B 27/017* (2013.01); *G06T 19/006* (2013.01)

(58) Field of Classification Search
None
See application file for complete search history.

(56) References Cited

U.S. PATENT DOCUMENTS

| 6,943,755 | B1 * | 9/2005 | Bartow | G02B 27/017 345/7 |
| 9,977,493 | B2 * | 5/2018 | Lanier | H04N 13/279 |
| 9,983,717 | B2 * | 5/2018 | Pacheco | G06F 3/04886 |
| 10,139,854 | B2 * | 11/2018 | Krishnakumar | G06F 3/041 |
| 10,268,433 | B2 * | 4/2019 | Shibata | G06F 3/03547 |
| 11,205,309 | B2 * | 12/2021 | Huang | G02B 27/017 |
| 2007/0296646 | A1 * | 12/2007 | Yamamoto | G02B 27/017 345/8 |
| 2012/0127284 | A1 * | 5/2012 | Bar-Zeev | G06T 19/006 348/158 |

(Continued)

*Primary Examiner* — Ryan M Gray
(74) *Attorney, Agent, or Firm* — JCIPRNET (57) ABSTRACT

An augmented reality system and an anchor display method thereof are provided. An environmental image is captured by an image capturing device disposed on a head-mounted device. A reference image block in the environmental image that matches a display image on a display is detected by performing feature matching between the environmental image and the display image. Position information of the reference image block in the environmental image is obtained. Depth information of the display is obtained according to an actual screen size of the display and a block size of the reference image block in the environmental image. At least one virtual object is displayed by the head-mounted device according to the position information and the depth information. The at least one virtual object is displayed as being anchored to at least one screen bezel of the display.

20 Claims, 6 Drawing Sheets

(56) References Cited

U.S. PATENT DOCUMENTS

| | | | |
|---|---|---|---|
| 2015/0221133 A1* | 8/2015 | Groten | G06T 11/00 |
| | | | 345/633 |
| 2015/0348322 A1* | 12/2015 | Ligameri | G02B 27/017 |
| | | | 345/633 |
| 2016/0370858 A1* | 12/2016 | Leppänen | H04N 21/4316 |
| 2017/0168296 A1* | 6/2017 | Giwnewer | G06F 3/011 |
| 2017/0374294 A1* | 12/2017 | Osman | H04N 21/43074 |
| 2018/0101994 A1* | 4/2018 | Da Veiga | G06F 3/04812 |
| 2018/0129050 A1* | 5/2018 | Hayashi | H04N 9/097 |
| 2021/0035367 A1* | 2/2021 | Verma | G06T 19/006 |

\* cited by examiner

AUGMENTED REALITY SYSTEM AND ANCHOR DISPLAY METHOD THEREOF

CROSS-REFERENCE TO RELATED APPLICATION

This application is a continuation application of U.S. application Ser. No. 17/022,038, filed on Sep. 15, 2020, now allowed, which claims the priority benefit of Taiwan application serial no. 109115102, filed on May 6, 2020. The entirety of each of the above-mentioned patent applications is hereby incorporated by reference herein and made a part of this specification.

BACKGROUND

Technical Field

The disclosure relates to an augmented reality (AR) apparatus, and more particularly, to an augmented reality system and an anchor display method thereof.

Description of Related Art

With the development of technology, augmented reality applications which apply virtual information to the real world are increasing.

In another aspect, as the amount of information to be processed increases, notebook computers equipped with a single screen have become unable to satisfy users' needs at work. In general, a user who works in an office may connect their notebook computer to a desktop display and use a multi-display function to improve efficiency. However, a user who works outside the office is less likely to enjoy the convenience provided by the multi-display function since they cannot carry the cumbersome desktop display all the time.

SUMMARY

The disclosure provides an augmented reality system and an anchor display method thereof, in which, by a head-mounted device, a virtual object may be displayed as being anchored to a screen bezel of a display.

An embodiment of the disclosure provides an anchor display method of an augmented reality system, the anchor display method including the following steps. An environmental image is captured by an image capturing device disposed on a head-mounted device. A reference image block in the environmental image that matches a display image on a display is detected by performing feature matching between the environmental image and the display image. Position information of the reference image block in the environmental image is obtained. Depth information of the display is obtained according to an actual screen size of the display and a block size of the reference image block in the environmental image. At least one virtual object is displayed by the head-mounted device according to the position information and the depth information. The at least one virtual object is displayed as being anchored to at least one screen bezel of the display.

An embodiment of the disclosure provides an augmented reality system, including a head-mounted device and a computer device. The head-mounted device includes an image capturing device capturing an environmental image. The computer device is connected to the head-mounted device, and includes a display, a storage device and a processor. The display displays a display image. The processor is coupled to the display and the storage device, and is configured to perform the following. A reference image block in the environmental image that matches the display image on the display is detected by performing feature matching between the environmental image and the display image. Position information of the reference image block in the environmental image is obtained. Depth information of the display is obtained according to an actual screen size of the display and a block size of the reference image block in the environmental image. At least one virtual object is displayed by the head-mounted device according to the position information and the depth information. The at least one virtual object is displayed as being anchored to at least one screen bezel of the display.

Based on the foregoing, in embodiments of the disclosure, by performing feature matching between the environmental image and the display image on the display, a screen bezel of the display may be identified in the environmental image, such that the position information of the screen bezel may be obtained. In addition, the depth information of the display may be estimated according to the actual screen size of the display and an imaging length of the screen bezel in the environmental image. When a virtual object is displayed by the head-mounted device according to the position information and the depth information, the virtual object may be displayed as being accurately and stably anchored to at least one screen bezel of the display. In this way, the anchor display of the virtual object not only allows a user to enjoy the convenience provided by the multi-display function, but also improves the user's experience in viewing the virtual object.

In order to make the aforementioned features and advantages of the disclosure comprehensible, embodiments accompanied with figures are described in detail below.

DESCRIPTION OF THE EMBODIMENTS

Several embodiments of the disclosure will be described in detail with reference to the drawings. With respect to reference numerals mentioned in the following description, elements in different drawings that are marked with identical reference numerals are regarded as identical or similar. These embodiments are merely a part of the disclosure, and do not disclose all possible implementations of the disclosure. That is, these embodiments are merely exemplary examples of the method and system described in the appended claims of the disclosure.

Figure 1:
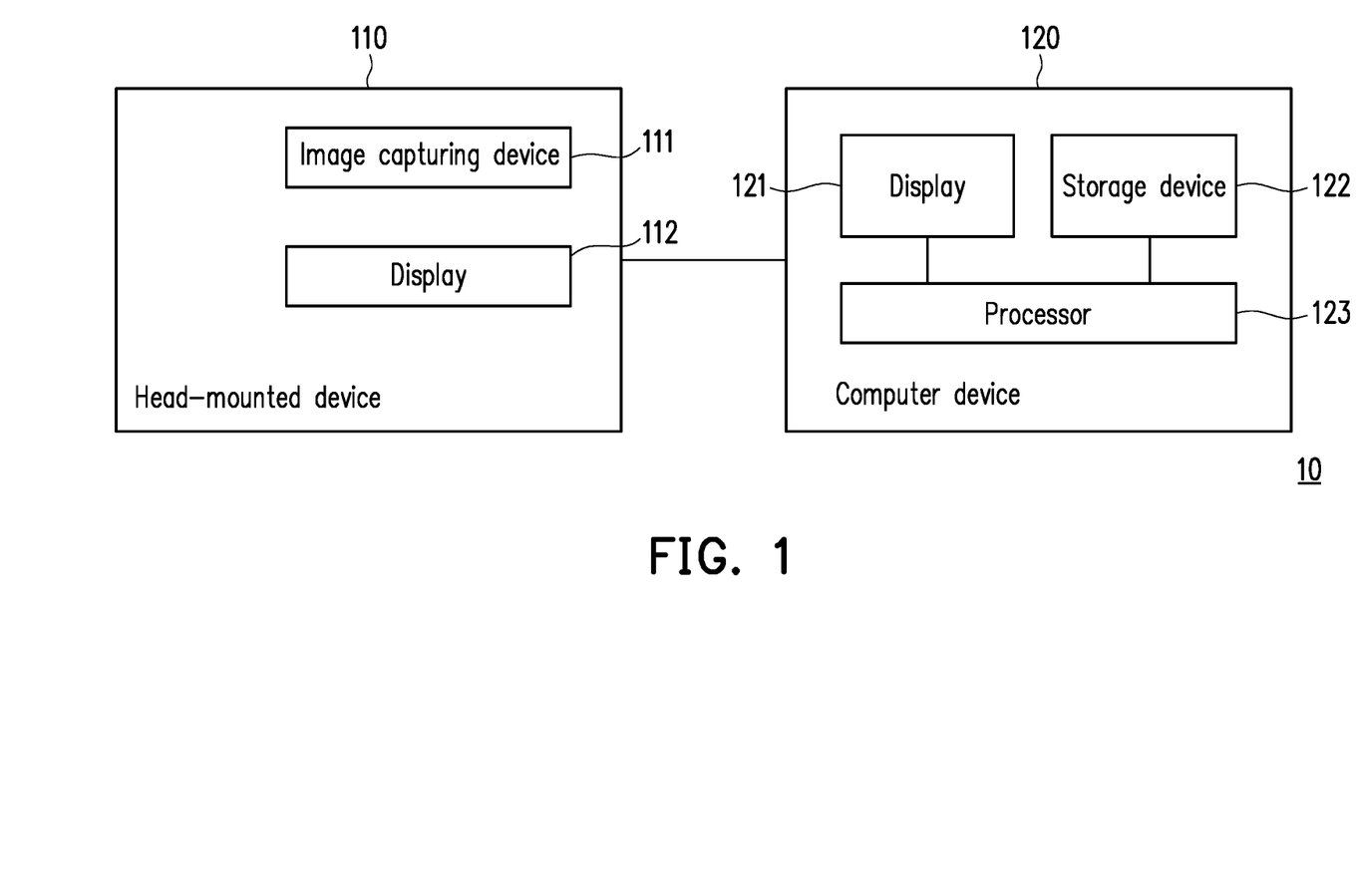
FIG. 1 is a schematic diagram of an augmented reality system according to an embodiment of the disclosure.

FIG. 1 is a schematic diagram of an augmented reality system according to an embodiment of the disclosure. Referring to FIG. 1, an augmented reality system 10 includes a head-mounted device 110 and a computer device 120. The head-mounted device 110 may be used to provide augmented reality (AR) content to a user, and is, for example, augmented reality glasses. In an embodiment, the head-mounted device 110 may be connected to the computer device 120, the computer device 120 may provide the AR content to the head-mounted device 110, and then the head-mounted device 110 may present the AR content to a user. The computer device 120 is, for example, an electronic device having a display function, such as a notebook computer, a smartphone, a tablet computer, an e-book reader, a video game console or the like, but the disclosure is not limited thereto. The head-mounted device 110 may communicate with the computer device 120 based on a wired or wireless communication method, and the disclosure is not limited thereto. For example, the head-mounted device 110 and the computer device 120 may transmit data to each other through a universal serial bus (USB) interface.

The head-mounted device 110 includes an image capturing device 111 and a display 112. The image capturing device 111 is configured to capture an environmental image, and includes an imaging lens including a lens and a photosensitive element. The photosensitive element is configured to sense intensity of light entering the lens and generate an image. For example, the photosensitive element may be a charge coupled device (CCD), a complementary metal-oxide semiconductor (CMOS) device, or other element, but the disclosure is not limited thereto. In an embodiment, the image capturing device 111 is fixed and disposed on the head-mounted device 110, and is configured to capture an image of an actual scene in front of the head-mounted device 110. For example, when the user wears the head-mounted device 110, the image capturing device 111 may be disposed between both eyes or outside of one eye of the user, and captures an image of the actual scene in front of the user.

The display 112 is a display device having a certain degree of light transmittance and capable of presenting to a viewer the actual scene located on the side opposite the viewer. The display 112 may display a virtual object by means of liquid crystals, an organic light emitting diode (OLED), electronic ink, projection or the like, and includes a translucent or transparent optical lens. As such, the content that the user views through the display 112 is a physical scene on which the virtual object is superimposed. In an embodiment, the display 112 may be implemented as a lens in the augmented reality glasses.

The head-mounted device 110 may further include, in addition to the image capturing device 111 and the display 112, components not shown in FIG. 1. Examples thereof include a motion sensor, a speaker, a controller, various communication interfaces, and so forth, and the disclosure is not limited thereto.

The computer device 120 includes a display 121, a storage device 122 and a processor 123. The display 121 may be a liquid crystal display (LCD), a light emitting diode (LED) display, an OLED display, or the like, and the disclosure is not limited thereto.

The storage device 122 is configured to store data and program codes (for example, an operating system, an application program, a driver program or the like) accessible to the processor 123, and may be in any form of a fixed or removable random access memory (RAM), read-only memory (ROM), flash memory, or a combination thereof.

The processor 123 is coupled to the display 121 and the storage device 122, and is, for example, a central processing unit (CPU), an application processor (AP), a programmable general-purpose or special-purpose microprocessor, a digital signal processor (DSP), an image signal processor (ISP), a graphics processing unit (GPU) or other similar device, integrated circuit, or a combination thereof. The processor 123 may access and execute the program codes and software elements stored in the storage device 122 to implement the anchor display method of the embodiment of the disclosure.

The computer device 120 may further include, in addition to the display 121, the storage device 122 and the processor 123, components not shown in FIG. 1. Examples thereof include a keyboard, a speaker, various communication interfaces, and so forth, and the disclosure is not limited thereto.

Figure 2:
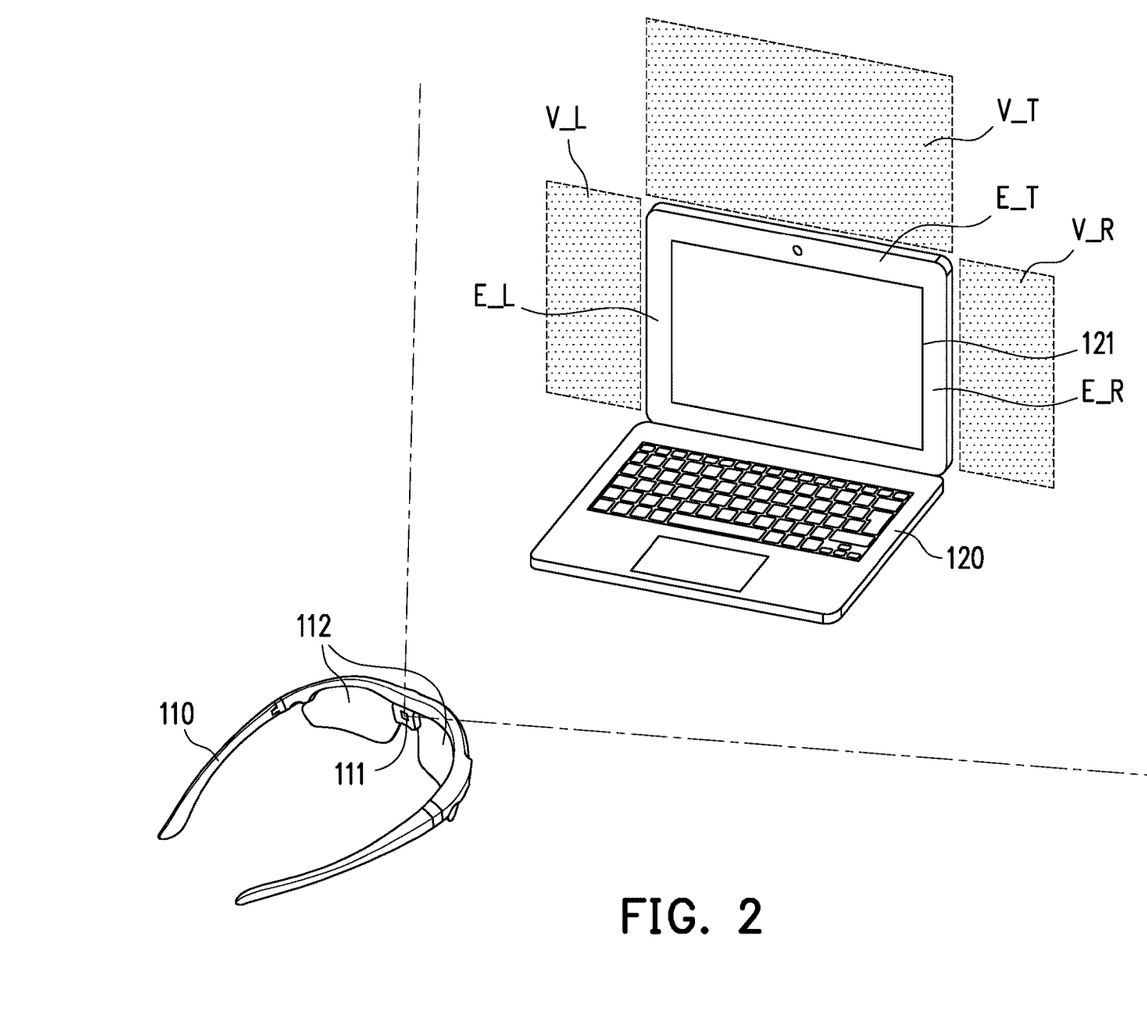
FIG. 2 is an application scenario diagram of the augmented reality system according to an embodiment of the disclosure.

FIG. 2 is an application scenario diagram of the augmented reality system according to an embodiment of the disclosure. Referring to FIG. 2, when the user views the display 121 while wearing the head-mounted device 110, the image capturing device 111 captures the environmental image toward the display 121. The computer device 120 may estimate position information and depth information of the display 121 in an augmented reality coordinate system according to the environmental image. Thereafter, the computer device 120 may determine a display boundary, a display size or a display position of at least one virtual object according to the position information and the depth information associated with the display 121.

As such, when the user views the display 121 through the display 112 of the head-mounted device 110, they may see the actual scene on which the virtual object is superimposed, wherein the virtual object is displayed as being anchored to at least one screen bezel of the display 121. That is, the virtual object is displayed as being fixed to an upper side, a left side or a right side of the display 121. As illustrated in FIG. 2, when the user views the display 121 through the display 112 of the head-mounted device 110, they may see virtual objects V_T, V_R, and V_L respectively aligned with an upper screen bezel E_T, a left screen bezel E_L and a right screen bezel E_R of the display 121. The virtual objects V_T, V_R, and V_L may be configured to provide the user with various information such as a window, a document, an image, a desktop wallpaper, a visual output generated by an application program, and so forth. As a result, it is possible for the user to enjoy the convenience brought by the multi-display function when viewing the display 121 through the head-mounted device 110. Note that FIG. 2 is only for illustrative purposes, and number of the virtual object and the screen bezel to which the virtual object is anchored are not limited in the disclosure.

It also should be noted that the image capturing device 111 may periodically capture the environmental image, and the computer device 120 may continuously update the position information and depth information of the display 121 in the augmented reality coordinate system, and accordingly continuously update the display boundary, the display size or the display position of the virtual object. In this way, when the display 121 is within a visual field of the head-mounted device 110, even if the user changes position or turns their head, the virtual object is still displayed as being anchored to the screen bezel of the display 121.

An anchor display method is described below in detail by way of embodiments with reference to the components of the augmented reality system 10.

Figure 3:
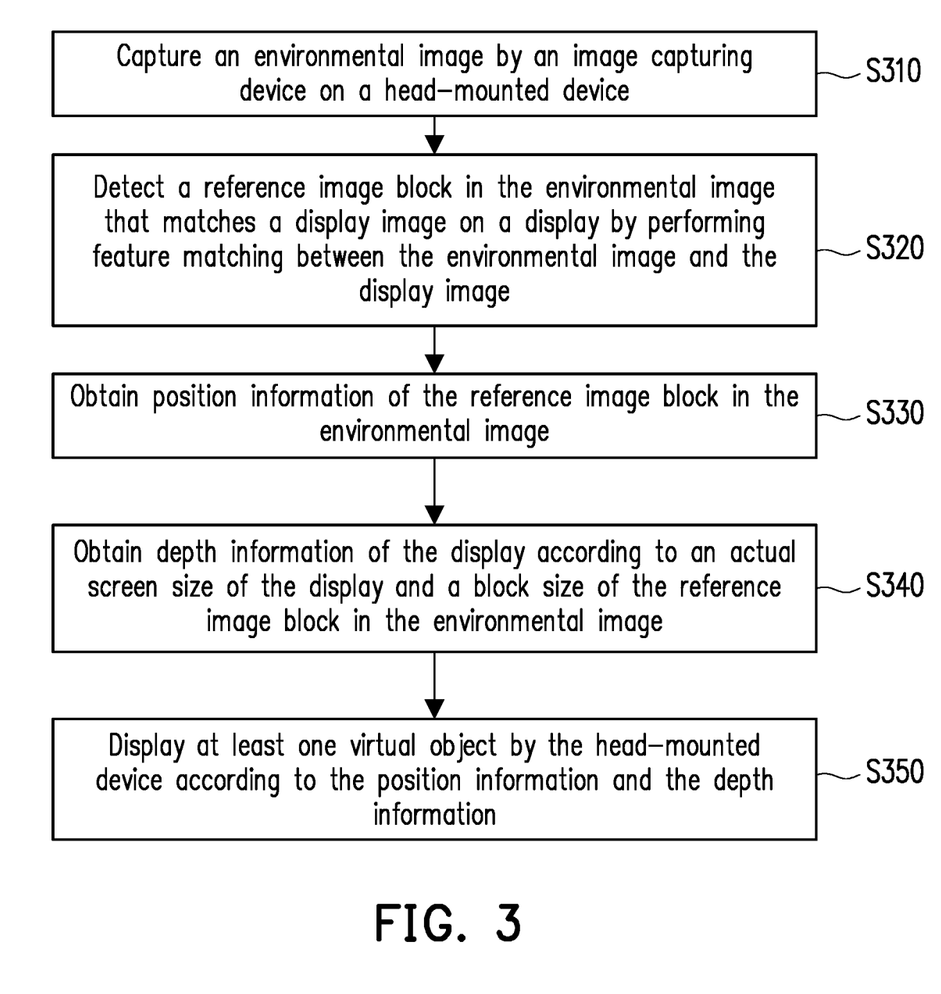
FIG. 3 is a flowchart of an anchor display method according to an embodiment of the disclosure.

FIG. 3 is a flowchart of the anchor display method according to an embodiment of the disclosure. Referring to FIG. 1 and FIG. 3, the anchor display method of this embodiment may be applied to the augmented reality system 10 in the above embodiment. Detailed steps of the anchor display method of this embodiment will be described with reference to the components of the augmented reality system 10.

In step S310, an environmental image is captured by the image capturing device 111 disposed on the head-mounted device 110. The environmental image is an image of an actual scene around the user. In detail, the image of the actual scene is associated with a visual field of the image capturing device 111. In an embodiment, the image capturing device 111 may capture the environmental image according to a capture frame rate, and the environmental image may have a time tag indicating the time of capturing. The image capturing device 111 may transmit the environmental image to the computer device 120 through a wired or wireless transmission interface.

In step S320, by performing feature matching between the environmental image and a display image on the display 121, the processor 123 detects a reference image block in the environmental image that matches the display image. In detail, the display image is screen data displayed by the display 121 at a specific time instant. When the user operates the computer device 120, the user's eyes are focused on the display 121, thereby enabling the image capturing device 111 to capture the environmental image including the display 121. That is, the processor 123 may identify the display 121 in the environmental image by comparing the image content. In detail, the processor 123 may extract image features respectively from the environmental image and the display image on the display 121 based on a feature extraction algorithm. The feature extraction algorithm is, for example, a scale invariant feature transformation (SIFT) algorithm, a speeded up robust features (SURF) algorithm, or the like. Next, the processor 123 may perform the feature matching between the image feature of the environmental image and the image feature of the display image. According to a result of the feature matching, the processor 123 may detect the reference image block in the environmental image that is similar to the display image on the display 121. For example, the processor 123 may define a block edge of the reference image block in the environmental image that is similar to the displayed image based on a random sample consensus (RANSAC) algorithm. Capturing distance and capturing direction of the image capturing device 111 as well as arrangement manner of the display 121 influence shape and size of the reference image block.

In more detail, at least one screen bezel of the display 121 corresponds to at least one block edge of the reference image block. In an embodiment, the virtual object is displayed on the upper side, the right side or the left side of the display 121. Therefore, the at least one block edge may include an upper block edge, a left block edge or a right block edge, and the at least one screen bezel of the display may include an upper screen bezel, a left screen bezel or a right screen bezel. The upper screen bezel of the display 121 may correspond to the upper block edge of the reference image block. The right screen bezel of the display 121 may correspond to the right block edge of the reference image block. The left screen bezel of the display 121 may correspond to the left block edge of the reference image block.

Figure 4:
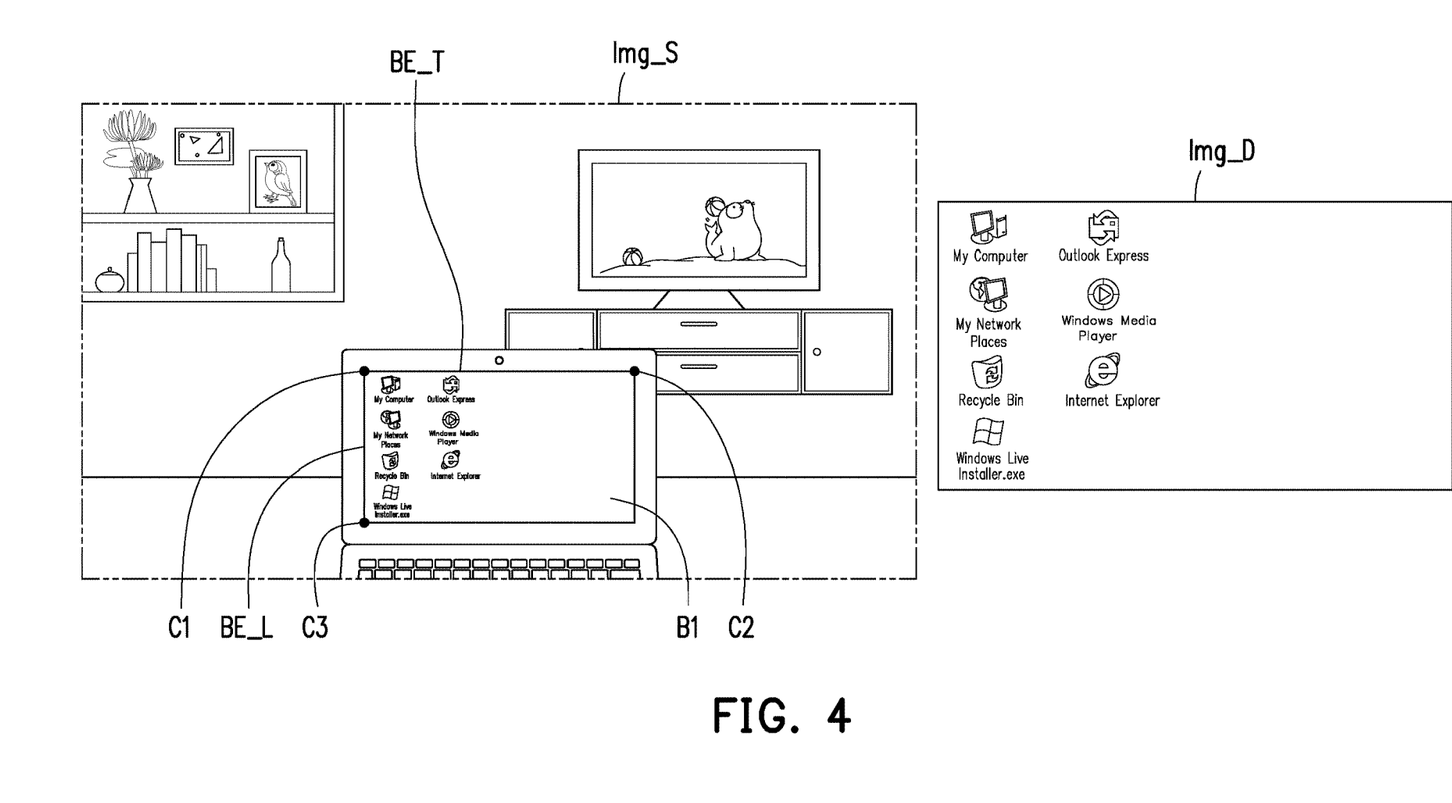
FIG. 4 is a schematic diagram of performing feature matching between an environmental image and a display image according to an embodiment of the disclosure.

FIG. 4 is a schematic diagram of performing feature matching between the environmental image and the display image according to an embodiment of the disclosure. Referring to FIG. 4, the image capturing device 111 may capture an environmental image Img_S. According to a time tag of the environmental image Img_S, the processor 123 may decide to perform the feature matching between the environmental image Img_S and a display image Img_D on the display 121, so as to find from the environmental image Img_S a reference image block B1 similar to the display image Img_D and obtain a block edge of the reference image block B1. In an embodiment, the processor 123 may more accurately detect a position of the display 121 according to the display image on the display 121 in comparison with a case of detecting the position of the display 121 by edge detection.

Note that, in an embodiment, the display image on the display 121 may include barcode information. The barcode information may be a one-dimensional barcode, a two-dimensional barcode or a three-dimensional barcode. Position and quantity of the barcode information are not limited in the disclosure. The barcode information may increase image features of the display image, and therefore may improve accuracy of the feature matching.

Next, in step S330, the processor 123 may obtain position information of the reference image block in the environmental image. The position information may include an edge position of a block edge of the reference image block in the environmental image. Alternatively, the position information may include a corner point position of a corner point of the reference image block in the environmental image. In detail, after identifying the reference image block in the environmental image that matches the display image, the processor 123 may obtain pixel coordinate information or image coordinate information of the reference image block in the environmental image. For example, the processor 123 may obtain pixel coordinates or image coordinates of at least two of four corner points of the reference image block, and may thus define the edge position of the at least one block edge of the reference block image in the environmental image.

For example, referring to FIG. 4, in a scenario where the virtual object is presented on the upper side of the display 121 (e.g., the virtual object V_T shown in FIG. 2), the processor 123 may obtain corner positions of two corner points C11 and C2 located on an upper side of the reference image block, and set an upper block edge BE_T between the two corner points C1 and C2 to be a lower display boundary of the virtual object. Alternatively, in a scenario where the virtual object is presented on the left side of the display 121 (e.g., the virtual object V_L shown in FIG. 2), the processor 123 may obtain corner positions of two corner points C1 and C3 located on a left side of the reference image block, and set a left block edge BE_L between the two corner points C1 and C3 to be a right display boundary of the virtual object. By setting the display boundaries of the virtual object according to the position information of the reference image block, the virtual object is anchored to a certain screen bezel without covering the content displayed on the display 121.

In step S340, the processor 123 obtains the depth information of the display 121 according to an actual screen size of the display 121 and a block size of the reference image block in the environmental image. Specifically, the actual screen size of the display 121 is fixed. In an embodiment, the actual screen size of the display 121 may be stored in extended display identification data (EDID) of the display 121, and may include a horizontal screen size (in cm) and a vertical screen size (in cm). Based on the principle of similar triangles in pinhole imaging, the processor 123 may estimate a distance (i.e., the depth information) between the display 121 and the image capturing device 111 according to the actual screen size of the display 121 and the block size (i.e., imaging size) of the reference image block. In an embodiment, the block size of the reference image block may include a length of the at least one block edge.

For example, in prior calibration and measurement, the image capturing device 111 may be used to capture an image of a reference display and obtain a calibration image. Assuming that a horizontal screen size in a predetermined screen size of the reference display is 31 cm, when a distance between the image capturing device 111 and the reference display is equal to a predetermined depth (e.g., 50 cm), the length of the upper block edge of the reference image block in the calibration image may be measured to be N pixels (i.e., a reference imaging length corresponding to the predetermined screen size). Accordingly, if the actual screen size of the display 121 is identical to that of the reference display, and the length of the upper block edge of the reference image block in the environmental image is also N pixels, the processor 123 may determine that the depth information between the display 121 and the image capturing device 111 is equal to the predetermined depth. If the actual screen size of the display 121 is identical to that of the reference display, and the length of the upper block edge of the reference image block in the environmental image is less than N pixels, the processor 123 may determine that the depth information between the display 121 and the image capturing device 111 is greater than the predetermined depth. If the actual screen size of the display 121 is identical to that of the reference display, and the length of the upper block edge of the reference image block in the environmental image is equal to N/2 pixels, the processor 123 may determine that the depth information between the display 121 and the image capturing device 111 is twice the predetermined depth.

Following the foregoing, if the actual screen size of the display 121 is different from the predetermined screen size of the reference display, the processor 123 may calculate a reference imaging length corresponding to the actual screen size of the display 121 according to the reference imaging length N corresponding to the predetermined screen size. For example, if the horizontal screen size of the display 121 is 35.5 cm, the reference imaging length corresponding to the actual screen size of the display 121 is equal to M pixels, in which M may be determined by performing an integerization operation on N*(35.5/31). The above integerization operation may include rounding, rounding down or rounding up. In short, the processor 123 may calculate the depth information of the display 121 according to the length of the block edge of the reference image block in the environmental image, the reference imaging length corresponding to the actual screen size of the display 121 and the predetermined depth. For example, depth information L of the display 121 may be calculated according to the following equation (1).

$$L/\text{predetermined depth} = \text{reference imaging length}/\text{length of block edge} \quad (1)$$

In the equation, the predetermined depth (in cm) and the reference imaging length (in pixel) may be determined based on the prior calibration and measurement, and the length (in pixel) of the block edge may be obtained from the environmental image.

Thereafter, in step S350, the processor 123 displays the at least one virtual object by the head-mounted device 110 according to the position information and the depth information. The at least one virtual object is displayed as being anchored to the at least one screen bezel of the display 121. In detail, in an embodiment, after the depth information of the display 121 is obtained, the processor 123 may define a reference plane for presenting the virtual object according to the depth information. The processor 123 may further obtain a display boundary of the virtual object on the reference plane according to the depth information and the position information provided by the environmental image. As such, the processor 123 may present the virtual object within the display boundary on the reference plane by the head-mounted device 110, so that the virtual object is displayed as being anchored to the at least one screen bezel of the display 121. The virtual object is anchored to the at least one screen bezel, and does not change position even when the head-mounted device 110 moves. Therefore, the virtual object is integrated with the display 121 in the actual scene, thereby enhancing the visual experience and convenience.

In addition, it should be noted that the processor 123 detects the position of the display 121 according to the display image on the display 121. Therefore, compared to a case where the position of the display 121 is detected through small special marks or totems, the resolution of the environmental image according to the embodiments of the disclosure does not need to be high. As a result, data transmission volume between the head-mounted device 110 and the computer device 120 may be reduced.

Note that, implementations of the disclosure are not limited to those discussed in the above, and may be adjusted based on practical requirements. For example, in an embodiment of the disclosure, a tilt degree of the display 121 may be estimated to enhance accuracy of estimation of the depth information.

Figure 5:
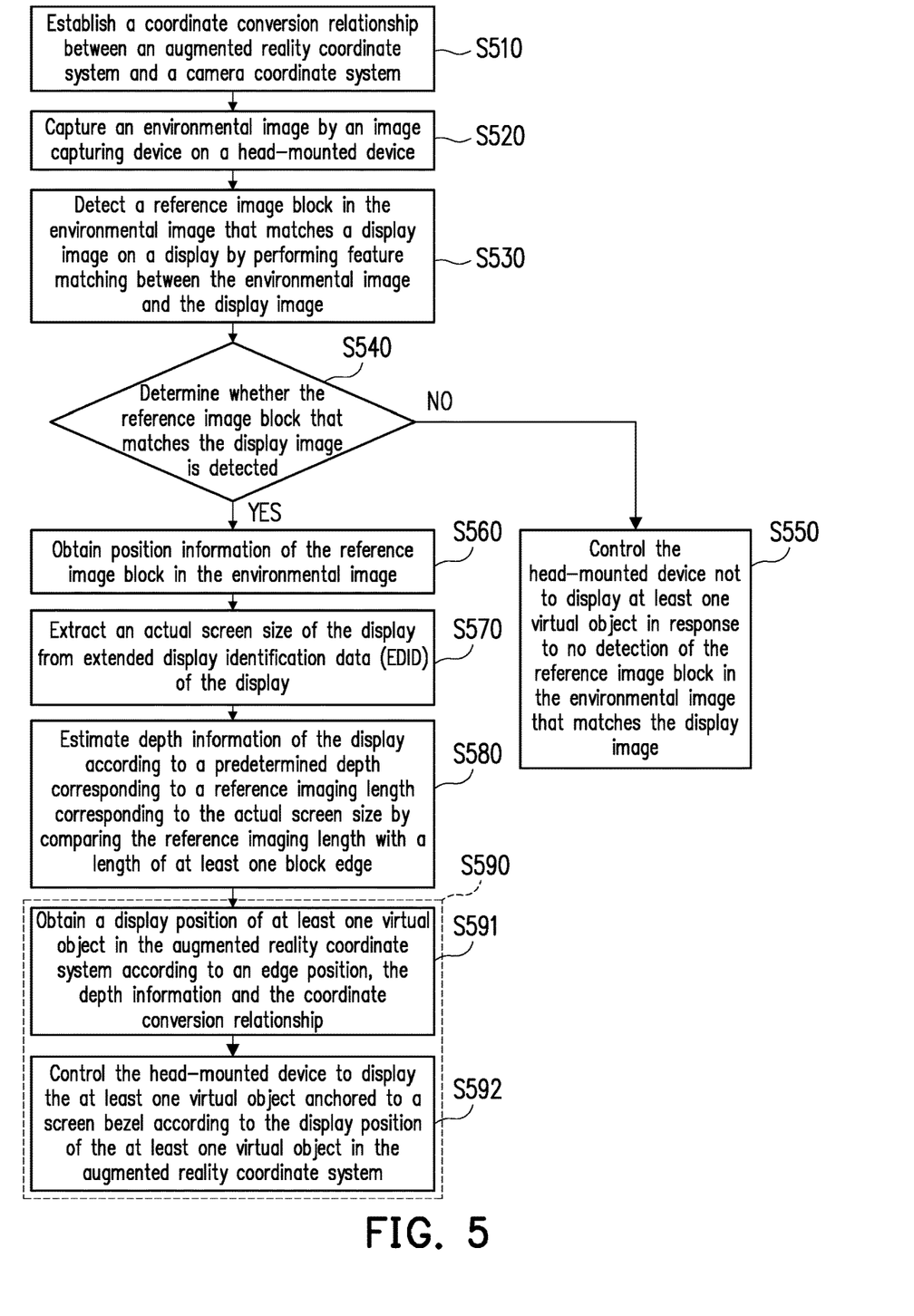
FIG. 5 is a flowchart of an anchor display method according to an embodiment of the disclosure.

FIG. 5 is a flowchart of an anchor display method according to an embodiment of the disclosure. Referring to FIG. 1 and FIG. 5, the anchor display method of this embodiment may be applied to the augmented reality system 10 in the above embodiment. Detailed steps of the anchor display method of this embodiment will be described with reference to the components of the augmented reality system 10.

In step S510, the processor 123 establishes a coordinate conversion relationship between an augmented reality coordinate system and a camera coordinate system. Since the image capturing device 111 is fixed and disposed on the head-mounted device 110, the coordinate conversion relationship may be established in advance and stored in the storage device 122 or a storage device of the head-mounted device 110. The coordinate conversion relationship may include a rotation matrix and a translation vector. This coordinate conversion relationship depends on the location where the image capturing device 111 is arranged in the augmented reality coordinate system and the image capturing direction of the image capturing device 111, and may be generated by prior measurement. The coordinate conversion relationship between the augmented reality coordinate system and the camera coordinate system may be expressed by an equation (2).

$$X_c = AX_{ar} + B \quad (2)$$

In the equation (2), $X_c$ represents three-dimensional coordinates in the camera coordinate system, $X_{ar}$ represents three-dimensional coordinates in the augmented reality coordinate system, A is a 3*3 rotation matrix, and B is a translation vector.

In step S520, an environmental image is captured by the image capturing device 111 disposed on the head-mounted device 110. In step S530, a reference image block in the environmental image that matches a display image on the display 121 is detected by performing feature matching between the environmental image and the display image. In an embodiment, the processor 123 may extract image features from a visual overlap region in the environmental image that overlaps the visual field of the display 112 and perform the feature matching accordingly. In step S540, the processor 123 determines whether a reference image block matching the display image is detected.

If NO is determined in step S540, in step S550, the processor 123 controls the head-mounted device 110 not to display at least one virtual object in response to no detection of the reference image block in the environmental image that matches the display image. Specifically, when no reference image block matching the display image exists in the environmental image, it may mean that the user's eyes are not focusing on the display 121, and the display of the virtual object is disabled. For example, when the user turns their head to talk to someone beside or behind, the processor 123 may disable the display of the virtual object.

If YES is determined in step S540, in step S560, the processor 123 obtains position information of the reference image block in the environmental image, and sets a block edge of the reference image block to be a display boundary of the virtual object. Next, in step S570, the processor 123 extracts an actual screen size of the display 121 from the EDID of the display 121. The actual screen size may include a horizontal screen size and/or a vertical screen size of the display 121. In step S580, by comparing a reference imaging length corresponding to the actual screen size with a length of at least one block edge, the processor 123 estimates depth information of the display 121 according to a predetermined depth corresponding to the reference imaging length. In an embodiment, the processor 123 may estimate the depth information of the display 121 according to a length of a block edge and a reference imaging length based on the aforementioned equation (1). In an alternative embodiment, the processor 123 may determine a screen tilt degree and the depth information of the display 121 according to lengths of a horizontal block edge (i.e., upper block edge or lower block edge) and a vertical block edge (i.e., left block edge or right block edge) of the reference image block.

Specifically, in an embodiment, the reference imaging length may include a reference imaging height and a reference imaging width, and the length of the at least one block edge includes a first edge length of the horizontal block edge and a second edge length of the vertical block edge. Firstly, the processor 123 may compare the reference imaging width with the first edge length and compare the reference imaging height with the second edge length. Next, the processor 123 may estimate the depth information according to a comparison result and the predetermined depth. In an embodiment, the storage device 122 may store therein the reference imaging height and the reference imaging width corresponding to the predetermined screen size and predetermined depth. Based on the reference imaging height and the reference imaging width corresponding to the predetermined screen size, the processor 123 may calculate the reference imaging height and the reference imaging width corresponding to the actual screen size of the display 121.

For example, it is assumed that in the predetermined screen size, the horizontal screen size is 31 cm and the vertical screen size is 14.7 cm, and it is assumed that the predetermined depth is 50 cm. Based on prior calibration and measurement, the reference imaging width corresponding to the predetermined screen size and predetermined depth is N1 pixels, and the reference imaging height corresponding to the predetermined screen size and predetermined depth is equal to N2 pixels. Therefore, if the horizontal screen size in the actual screen size of the display 121 is 35.5 cm and the vertical screen size in the actual screen size of the display 121 is 19.4 cm, the reference imaging width and the reference imaging height are M1 pixels and M2 pixels, respectively. The reference imaging width M1 may be determined by performing an integerization operation on N1*(35.5/31), and the reference imaging height M2 may be determined by performing an integerization operation on N2*(19.4/14.7).

As a result, in an embodiment, if the first edge length of the horizontal block edge in the environmental image is equal to the reference imaging width M1 and the second edge length of the vertical block edge in the environmental image is equal to the reference imaging height M2, the processor 123 may determine that the depth information of the display 121 is equal to the predetermined depth. If the first edge length of the horizontal block edge in the environmental image is equal to the reference imaging width M1 and the second edge length of the vertical block edge in the environmental image is less than the reference imaging height M2, the processor 123 may determine that the depth information of the display 121 is equal to the predetermined depth. If the first edge length of the horizontal block edge in the environmental image is less than the reference imaging width M1 and the second edge length of the vertical block edge in the environmental image is equal to the reference imaging height M2, the processor 123 may determine that the depth information of the display 121 is equal to the predetermined depth. In other words, when the first edge length of the horizontal block edge in the environmental image is equal to the reference imaging width or the second edge length of the vertical block edge in the environmental image is equal to the reference imaging height, the processor 123 may directly determine that the depth information of the display 121 is equal to the predetermined depth.

In addition, if the first edge length of the horizontal block edge in the environmental image is less than the reference imaging width M1, the second edge length of the vertical block edge in the environmental image is less than the reference imaging height M2, and a ratio between the first edge length and the second edge length is identical to an aspect ratio in the actual screen size, the processor 123 may estimate the depth information of the display 121 according to the predetermined depth based on the principle of similar triangles. If the first edge length of the horizontal block edge in the environmental image is less than the reference imaging width M1, the second edge length of the vertical block edge is less than the reference imaging height M2, and the ratio between the first edge length and the second edge length is not identical to the aspect ratio in the actual screen size, the processor 123 may calculate the tilt degree (e.g., an angle between a display plane of the display 121 and a reference vertical plane) of the display 121 according to the ratio between the first edge length and the second edge length, and may accurately estimate the depth information of a certain screen bezel of the display 121 according to the tilt degree. Based on the foregoing, the processor 123 may more accurately estimate the depth information of a specific screen bezel by estimating a screen tilt degree.

A depth estimation method in the case where the first edge length of the horizontal block edge is greater than the reference imaging width M1 or the second edge length of the vertical block edge is greater than the imaging height M2 can be easily inferred or known by analogy by a person skilled in the art with reference to the above-mentioned examples, and details thereof are thus omitted herein.

In step S590, the processor 123 displays at least one virtual object by the head-mounted device 110 according to the position information and the depth information. That is, the processor 123 may calculate a display position of a virtual object in the augmented reality system based on the environmental image captured by a single image capturing device 111. In detail, in a sub-step S591, the processor 123 obtains a display position of the at least one virtual object in the augmented reality coordinate system according to an edge position, the depth information and the coordinate conversion relationship. Specifically, the processor 123 may determine a three-dimensional display position of the virtual object in the camera coordinate system according to the edge position in the environmental image and the depth information of the display 121. Thereafter, the processor 123 may convert the three-dimensional display position of the virtual object in the camera coordinate system into a three-dimensional display position of the virtual object in the augmented reality coordinate system based on the coordinate conversion relationship. For example, the processor 123 may derive the three-dimensional display position of the virtual object in the augmented reality coordinate system based on the equation (2).

In step S592, according to the display position of the at least one virtual object in the augmented reality coordinate system, the processor 123 controls the head-mounted device 110 to display the virtual object as being anchored to a screen bezel. By a known geometric vector projection algorithm, the processor 123 may generate display data for the head-mounted device 110 according to the display position of the virtual object in the augmented reality coordinate system. As such, when the head-mounted device 110 performs displaying according to the display data provided by the processor 123, the user may see the virtual object anchored on the screen bezel of the display 121 and the virtual object is not separated from the screen bezel of the display 121 even if the user moves or turns their head.

Figure 6:
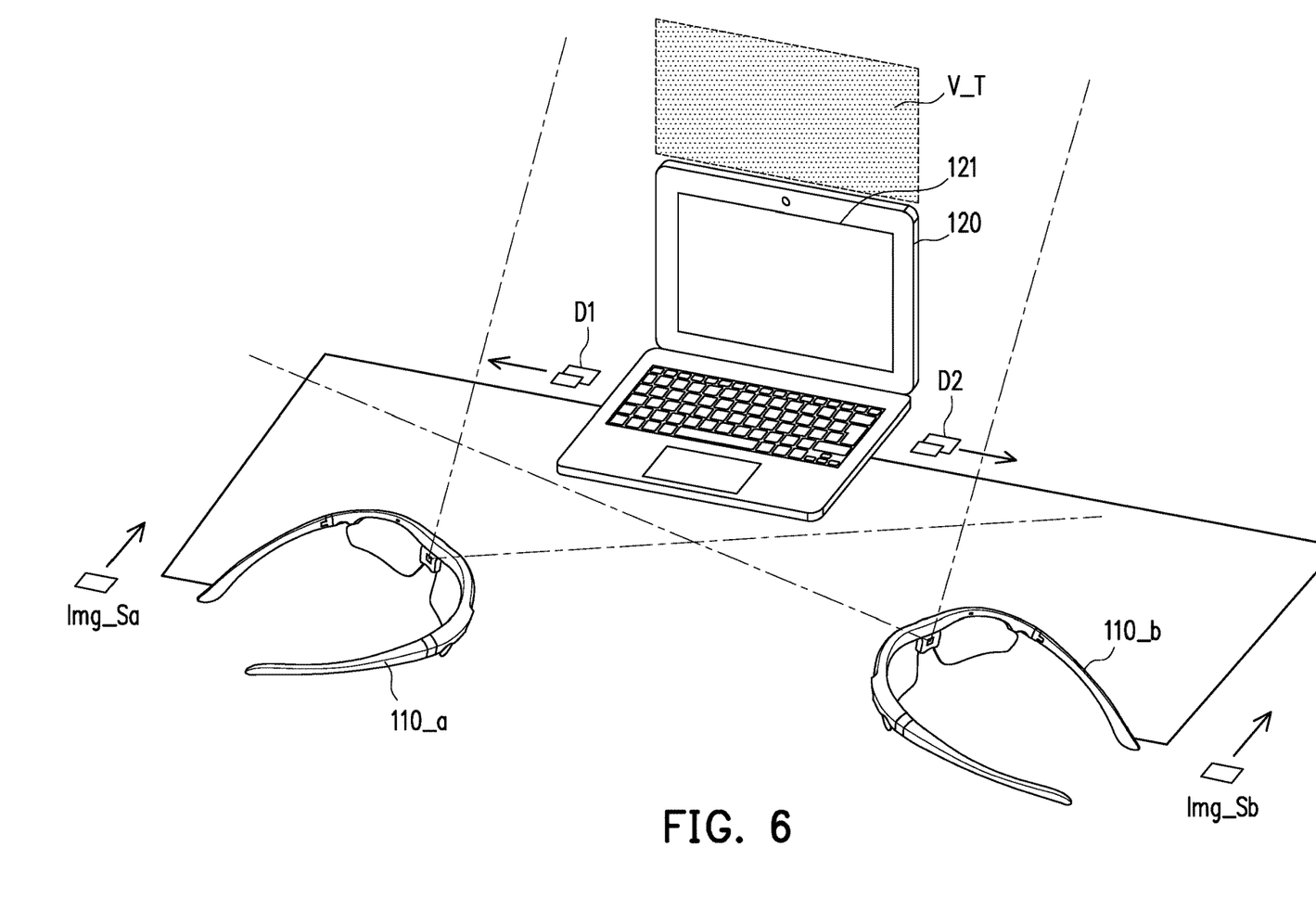
FIG. 6 is an application scenario diagram of the augmented reality system according to an embodiment of the disclosure.

FIG. 6 is an application scenario diagram of the augmented reality system according to an embodiment of the disclosure. Referring to FIG. 6, in this embodiment, two users may respectively wear a head-mounted device 110_a and a head-mounted device 110_b. The head-mounted devices 110_a and 110_b may respectively transmit an environmental image Img_Sa and an environmental image Img_Sb to the computer device 120. With reference to the principles described in the foregoing embodiments, the computer device 120 may determine a display position of the virtual object V_T corresponding to the head-mounted device 110_a according to the environmental image Img_Sa, and determine another display position of the virtual object V_T corresponding to the head-mounted device 110_b according to the environmental image Img_Sb. As such, the computer device 120 may generate display data D1 for the head-mounted device 110_a and display data D2 for the head-mounted device 110_b respectively according to the two display positions of the virtual object V_T. Correspondingly, the head-mounted devices 110_a and 110_b may respectively provide augmented reality content according to the display data D1 and D2, such that the two users may respectively view the virtual object V_T anchored to the screen bezel of the display 121 through the head-mounted devices 110_a and 110_b.

To sum up, in the embodiments of the disclosure, the display position of the virtual object may be determined according to the size information and position information of the reference image block in the environmental image that matches the display image on the display, and the virtual object may be displayed as being anchored to a screen bezel of the display. In this way, when the user views the display while wearing the head-mounted device, even if the display or the head-mounted device dynamically moves, the virtual object presented by the head-mounted device is satisfactorily aligned with and stuck to the screen bezel of the display. As a result, the user may obtain more information through the virtual object and have a good viewing experience.

Although the disclosure is described with reference to the above embodiments, the embodiments are not intended to limit the disclosure. A person skilled in the art may make variations and modifications without departing from the spirit and scope of the disclosure. Therefore, the protection scope of the disclosure should be subject to the appended claims.

What is claimed is:

1. An anchor display method of an augmented reality system, comprising:
   capturing an environmental image by an image capturing device disposed on a head-mounted device;
   detecting a reference image block in the environmental image that matches a display image on a display by performing feature matching between the environmental image and the display image;
   obtaining position information of the reference image block in the environmental image, wherein the position information comprises an edge position of at least one block edge of the reference image block;
   obtaining depth information of the display according to an actual screen size of the display and a block size of the reference image block in the environmental image;
   displaying at least one virtual object by the head-mounted device according to the position information and the depth information; and
   controlling the head-mounted device not to display the at least one virtual object in response to no detection of the reference image block in the environmental image that matches the display image.

2. The anchor display method of claim 1, wherein the at least one screen bezel of the display corresponds to the at least one block edge of the reference image block and the block size comprises a length of the at least one block edge.

3. The anchor display method of claim 2, wherein the at least one block edge comprises an upper block edge, a left block edge or a right block edge, and the at least one screen bezel of the display comprises an upper screen bezel, a left screen bezel or a right screen bezel.

4. The anchor display method of claim 2, wherein displaying the at least one virtual object by the head-mounted device according to the position information and the depth information comprises:
   obtaining a display position of the at least one virtual object in an augmented reality coordinate system according to the edge position, the depth information and a coordinate conversion relationship; and
   establishing the coordinate conversion relationship between the augmented reality coordinate system and a camera coordinate system.

5. The anchor display method of claim 2, further comprising:
   extracting the actual screen size of the display from extended display identification data (EDID) of the display,
   wherein obtaining the depth information of the display according to the actual screen size of the display and the block size of the reference image block in the environmental image comprises:
   estimating the depth information according to a predetermined depth corresponding to a reference imaging length corresponding to the actual screen size by comparing the reference imaging length with the length of the at least one block edge.

6. The anchor display method of claim 5, wherein the reference imaging length comprises a reference imaging height and a reference imaging width, and the length of the at least one block edge comprises a first edge length of a horizontal block edge and a second edge length of a vertical block edge,
　　wherein estimating the depth information according to the predetermined depth corresponding to the reference imaging length corresponding to the actual screen size by comparing the reference imaging length with the length of the at least one block edge comprises:
　　comparing the reference imaging width with the first edge length, and comparing the reference imaging height with the second edge length; and
　　estimating the depth information according to a comparison result and the predetermined depth.

7. The anchor display method of claim 5, wherein obtaining the depth information of the display according to the actual screen size of the display and the block size of the reference image block in the environmental image further comprises:
　　calculating the reference imaging length corresponding to the actual screen size of the display according to another reference imaging length corresponding to a predetermined screen size.

8. The anchor display method of claim 5, wherein the ratio between the depth information of the display and the predetermined depth is equal to the ratio between the reference imaging length corresponding to the actual screen size of the display and the length of the at least one block edge.

9. The anchor display method of claim 1, wherein the environmental image has a time tag, the feature matching between the environmental image and the display image is performed according to the time tag of the environmental image.

10. The anchor display method of claim 1, wherein the display image on the display comprises barcode information.

11. An augmented reality system, comprising:
　　a head-mounted device, comprising an image capturing device, wherein the image capturing device captures an environmental image;
　　a computer device, connected to the head-mounted device, comprising:
　　　　a display displaying a display image;
　　　　a storage device; and
　　　　a processor, coupled to the display and the storage device, configured to:
　　　　detect a reference image block in the environmental image that matches the display image by performing feature matching between the environmental image and the display image on the display;
　　　　obtaining position information of the reference image block in the environmental image, wherein the position information comprises an edge position of at least one block edge of the reference image block;
　　　　obtain depth information of the display according to an actual screen size of the display and a block size of the reference image block in the environmental image;
　　　　display at least one virtual object by the head-mounted device according to the position information and the depth information; and
　　　　controlling the head-mounted device not to display the at least one virtual object in response to no detection of the reference image block in the environmental image that matches the display image.

12. The augmented reality system of claim 11, wherein the at least one screen bezel of the display corresponds to the at least one block edge of the reference image block and the block size comprises a length of the at least one block edge.

13. The augmented reality system of claim 12, wherein the at least one block edge comprises an upper block edge, a left block edge or a right block edge, and the at least one screen bezel of the display comprises an upper screen bezel, a left screen bezel or a right screen bezel.

14. The augmented reality system of claim 12, wherein the processor is further configured to:
　　obtain a display position of the at least one virtual object in an augmented reality coordinate system according to the edge position, the depth information and a coordinate conversion relationship; and
　　establish the coordinate conversion relationship between the augmented reality coordinate system and a camera coordinate system.

15. The augmented reality system of claim 12, wherein the processor is further configured to:
　　extract the actual screen size of the display from extended display identification data (EDID) of the display; and
　　estimate the depth information according to a predetermined depth corresponding to a reference imaging length corresponding to the actual screen size by comparing the reference imaging length with the length of the at least one block edge.

16. The augmented reality system of claim 15, wherein the reference imaging length comprises a reference imaging height and a reference imaging width, and the length of the at least one block edge comprises a first edge length of a horizontal block edge and a second edge length of a vertical block edge, wherein the processor is further configured to:
　　compare the reference imaging width with the first edge length, and compare the reference imaging height with the second edge length; and
　　estimate the depth information according to a comparison result and the predetermined depth.

17. The augmented reality system of claim 15, wherein the processor is further configured to:
　　calculate the reference imaging length corresponding to the actual screen size of the display according to another reference imaging length corresponding to a predetermined screen size.

18. The augmented reality system of claim 15, wherein the ratio between the depth information of the display and the predetermined depth is equal to the ratio between the reference imaging length corresponding to the actual screen size of the display and the length of the at least one block edge.

19. The augmented reality system of claim 11, wherein the environmental image has a time tag, and the processor is further configured to perform the feature matching between the environmental image and the display image according to the time tag of the environmental image.

20. The augmented reality system of claim 11, wherein the display image on the display comprises barcode information.

* * * * *